(12) United States Patent  (10) Patent No.: US 8,823,807 B2
Schinker  (45) Date of Patent: Sep. 2, 2014

(54) METHODS AND APPARATUS FOR ENHANCED REALITY MESSAGING

(71) Applicant: Robert Schinker, Commerce Township, MI (US)

(72) Inventor: Robert Schinker, Commerce Township, MI (US)

( * ) Notice: Subject to any disclaimer, the term of this patent is extended or adjusted under 35 U.S.C. 154(b) by 130 days.

(21) Appl. No.: 13/709,158

(22) Filed: Dec. 10, 2012

(65) Prior Publication Data

US 2014/0002677 A1 Jan. 2, 2014

Related U.S. Application Data

(60) Provisional application No. 61/569,000, filed on Dec. 9, 2011.

(51) Int. Cl.
*H04N 5/225* (2006.01)
*H04N 9/04* (2006.01)
*H04N 5/272* (2006.01)
*H04N 5/232* (2006.01)

(52) U.S. Cl.
CPC ............. *H04N 5/232* (2013.01); *H04N 5/272* (2013.01)
USPC .................................. 348/207.1; 348/333.01

(58) Field of Classification Search
USPC ................. 348/143, 207.1, 239, 333.99, 578, 348/586–587
See application file for complete search history.

(56) References Cited

U.S. PATENT DOCUMENTS

| | | | | |
|---|---|---|---|---|
| 5,574,511 A * | 11/1996 | Yang et al. | ..................... | 348/586 |
| 6,466,830 B1 * | 10/2002 | Manross et al. | ................ | 700/83 |
| 7,774,705 B2 * | 8/2010 | Erol et al. | ...................... | 715/719 |
| 7,859,551 B2 * | 12/2010 | Bulman et al. | ................ | 345/630 |
| 2001/0055414 A1 * | 12/2001 | Thieme | .......................... | 382/135 |
| 2002/0018070 A1 * | 2/2002 | Lanier | ........................... | 345/629 |
| 2003/0012454 A1 * | 1/2003 | Manico et al. | ................ | 382/282 |
| 2003/0152376 A1 * | 8/2003 | Maeda et al. | ...................... | 396/2 |
| 2004/0028397 A1 * | 2/2004 | Maekawa et al. | ................ | 396/2 |
| 2009/0262217 A1 * | 10/2009 | Mack et al. | ................... | 348/239 |
| 2010/0008657 A1 * | 1/2010 | Gassman et al. | .................. | 396/2 |
| 2010/0296801 A1 * | 11/2010 | Lane | ................................ | 396/2 |

* cited by examiner

*Primary Examiner* — Roberto Velez
*Assistant Examiner* — Tuan Le
(74) *Attorney, Agent, or Firm* — The Weintraub Group, P.L.C.

(57) ABSTRACT

The present invention provides a method for delivering an enhanced reality message. The method includes sending a medium containing a code or indicia corresponding to a recorded video to a recipient, said video including an altered "green screen" background. A web server is operated to send the recorded video including the altered "green screen" background to a recipient's computer when the corresponding code or indicia is received from the client computer. The method also includes superimposing the recorded, altered video over an image acquired by a webcam of the recipient's computer, and to position the recorded video on the display screen dependent upon the location of a special marker on an object seen by the webcam.

4 Claims, 12 Drawing Sheets

LOGO/HEADER — 30

CONGRATULATIONS!
YOUR HOLOGRAM MESSAGE HAS
BEEN SUCCESSFULLY CAPTURED!

PLEASE TAKE YOUR VOUCHER FROM THE SLOT BELOW.

THIS VOUCHER IS REQUIRED TO
TRANSFER YOUR MESSAGE TO THE POSTCARDS
THAT YOU SELECT.

THANK YOU.

METHODS AND APPARATUS FOR ENHANCED REALITY MESSAGING

CROSS REFERENCE TO RELATED APPLICATION

This application claims the benefit of U.S. Provisional Application, 61/569,000 which was filed on Dec. 9, 2011, the disclosure of which is hereby incorporated by reference in its entirety, including the drawing.

BACKGROUND OF THE INVENTION

Field of the Invention

This invention relates generally to methods and apparatus for sending and receiving messages, and more particularly to methods and apparatus particularly suitable for sending and receiving enhanced or augmented reality audio-visual messages.

The sending of picture postcards from distant resorts to family members or friends with the message, "Wish you were here," is so common that is has become an American cliché. However, postcards convey only a static image with a written message.

Today, with Internet-connected cell phones, cameras, and computers, it is possible to send an audio-visual message to someone while away on vacation. However, these messages are often bland or are limited to the available scenery. It would be desirable to provide methods and apparatus to enhance such messages so that they provide a greater impact upon their recipient.

SUMMARY OF THE INVENTION

The present invention is predicated upon the following key elements, to wit, (a) capturing a 2D video of a person in front of a green screen, (b) eliminating the green background to render the background transparent, (c) assigning a unique identifier to the video and storing it in a database, (d) using augmented reality protocols to display the video over a marker, (e) mapping the 2D video with the transparent background in a plane in 3D space, thereby creating an illusion of the person "standing" approximately perpendicular to the marker, and (f) optionally, combining the video of the person with other 3D elements within the augmented reality environment.

Thus, in a first aspect of the present invention, there is provided a method for delivering the enhanced reality message. The method generally comprises sending a medium containing a code or indicia corresponding to the recorded video to a recipient. As noted above, the "green screen" background, used to make the video has the "green" background eliminated from the video using standard software to create a transparent alpha channel background. A web server sends the recorded video, including the altered "green screen" background, to a webcam-equipped recipient computer, or mobile device such as a smart phone or tablet PC, when a corresponding code or indicia is received from the computer or mobile device. Once the indicia is received the video acquired by the webcam is positioned on the display screen of the computer dependent upon the location of a calibration marker on an object seen by the webcam.

When viewed, a 2D video is oriented in a 3D environment approximately perpendicular to the marker to create the illusion that a person is standing on top of the marker. The system may be programmed to use "real world" items, such as a human hand in place of the calibration marker. In the case of a human hand, for instance, the person in the video would appear to be standing on the hand that is held in view of the camera.

The present method contemplates the inclusion of 3D peripherals or accoutrements such as palm trees, flora and the like.

In another aspect, hereof, the present invention provides an enhanced messaging system. The system includes a kiosk or other structure or other environment having means for attaching a "green screen" background to render it transparent and a camera configured to record a video of a person standing in front of the alterable "green screen" background. The system further includes a medium configured to deliver a code or indicia corresponding to the recorded video to a recipient. The system also includes a web server responsive to a recipient computer and configured to display the video altered by the "green screen" processor on a display screen of the recipient's computer when the code or indicia corresponding to the recorded video is received. When the recorded, altered video is superimposed upon a webcam picture that includes an image of a special marker, the location of the recorded, altered video on the display screen, dependent upon the location of the image of the calibration marker on the display screen, appears to be perpendicular to the marker.

Additional features of the present invention are described in the detailed description, the accompanying drawings, or both.

The foregoing summary, as well as the following detailed description of certain embodiments of the present invention, will be better understood when read in conjunction with the appended drawings.

DETAILED DESCRIPTION OF THE PREFERRED EMBODIMENT

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In its broadest aspects, the present invention comprises the recording of and playing back of an enhanced reality audio-visual message to one or more of a selected group of recipients.

Figure 1:
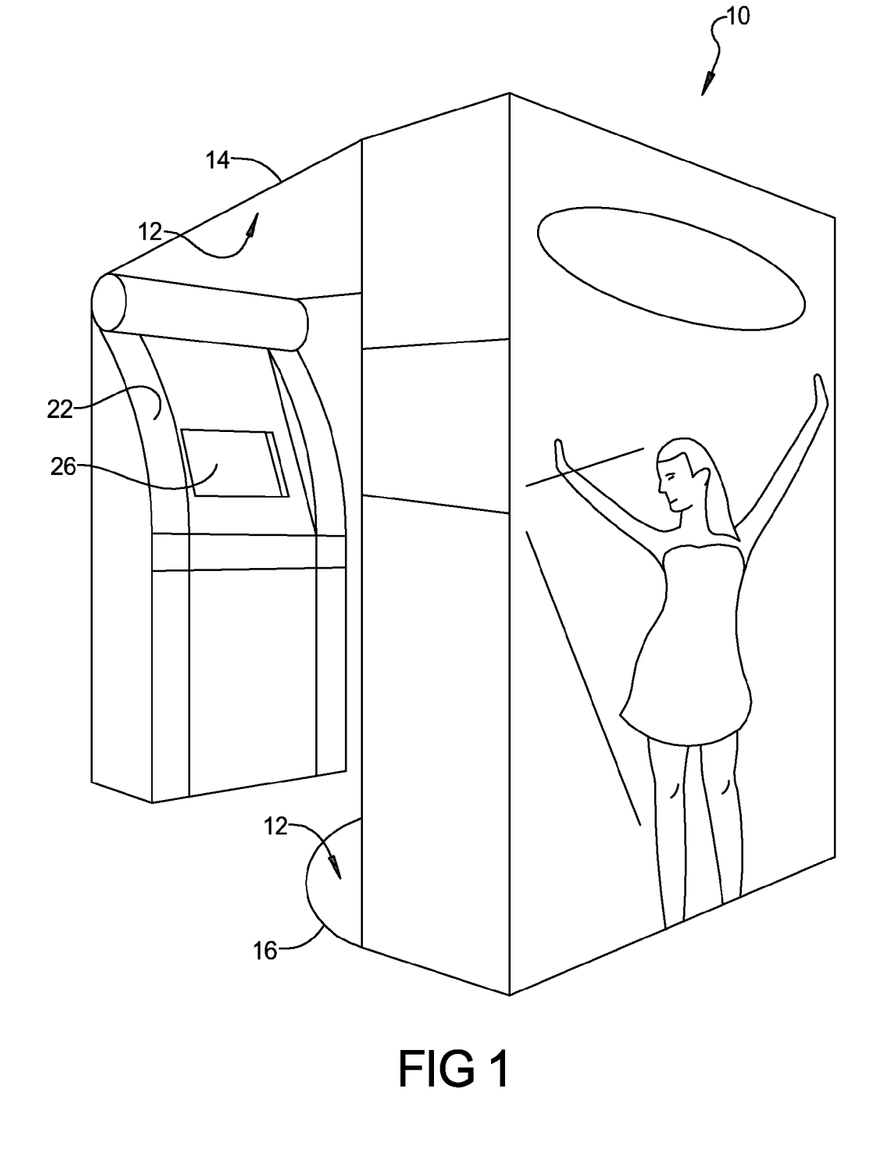
FIG. 1 is a pictorial view of a kiosk useful in practicing the present invention.
Figure 2:
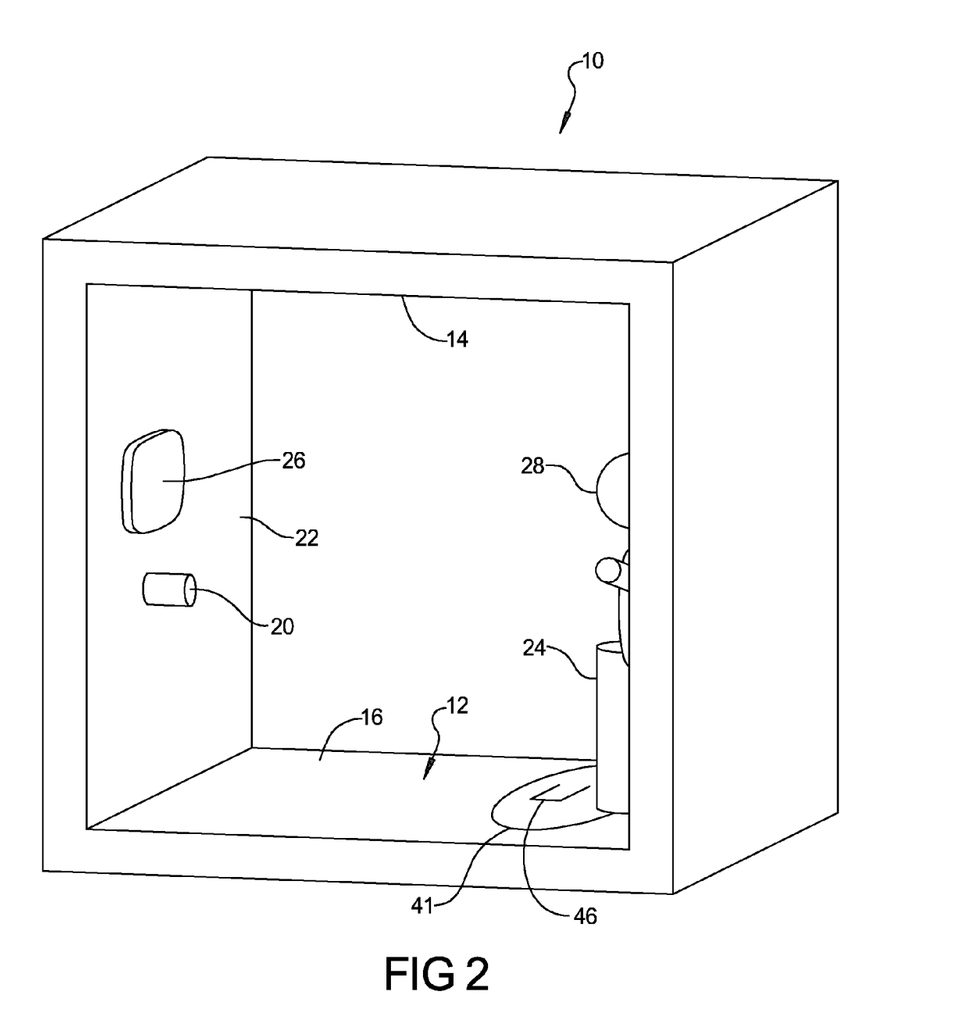
FIG. 2 is a simplified isometric view of the kiosk of FIG. 1.
Figure 3:
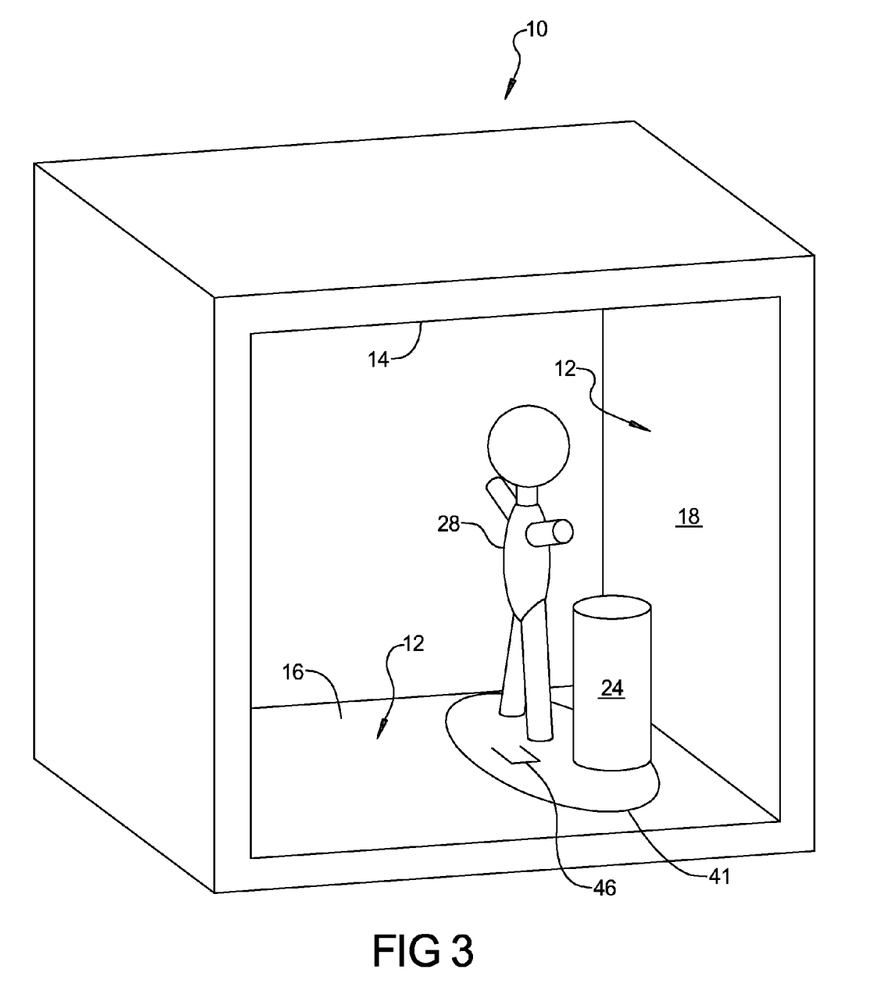
FIG. 3 is another simplified isometric view of the kiosk of FIG. 1 from an angle different from that shown in FIG. 2.

With more particularity and referring to FIGS. 1-3, a person wishing to appear in an enhanced reality audio-visual message enters a kiosk or other structure 10. The structure 10 is preferably a walled structure having a background wall 12 which includes a "green screen" disposed proximate a back wall 18, a top wall 14, a front wall 22 and a bottom or floor 16. It is to be understood that the term "green screen" as used herein is not intended to be limited only to a green background, as any color that can be used for chroma keying can be used, particularly one that does not appear in normal human skin tone can be used, such as blue green. Further, as noted above preferably, the background is rendered transparent through a suitable processor eliminating the green color to provide a transparent alpha channel background.

The background wall 12 covers at least a background field of view, including, preferably at least part of the top or ceiling 14 and bottom or floor 16 of the kiosk 10 and all or a portion of the back wall 18 is covered. A camera 20, configured to record a person 28 or other animate object, can be disposed at the front wall. Optionally, one or more props 24 may also be provided within the field of view of camera 20. Props 24 may have colors different from the screen background. The kiosk 10, also includes a display screen 26. Although camera 20 is shown in FIG. 2 as being below the display screen 26, it need not be located as shown. For example, camera 20 may be located above and/or to either side of display screen 26.

Figure 4:
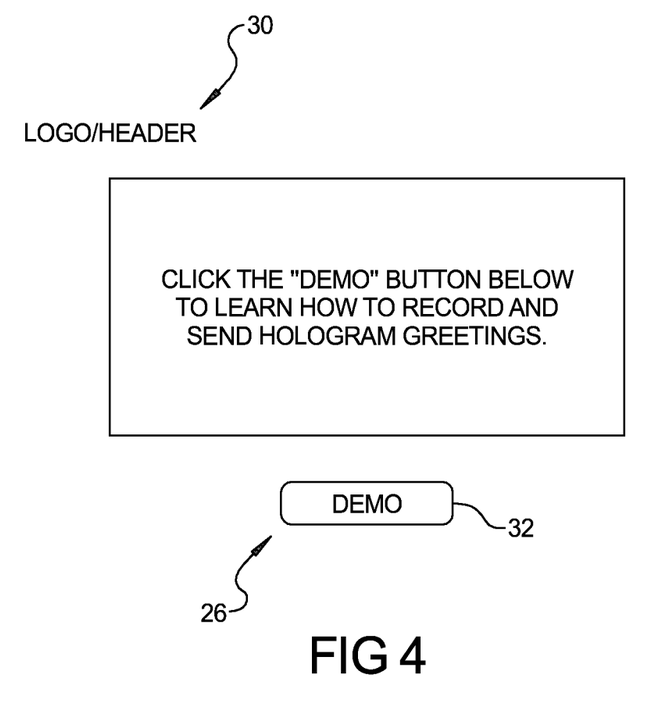
FIG. 4 is a representation of a displayed instruction that appears on the display screen of the kiosk of the present invention.
Figure 5:
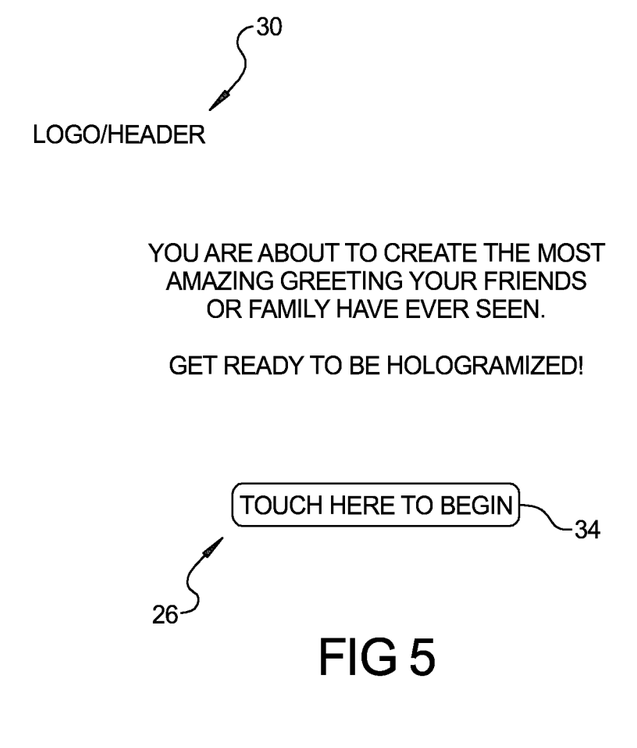
FIG. 5 is a representation of another displayed instruction that appears on the display screen of the kiosk of the present invention.
Figure 6:
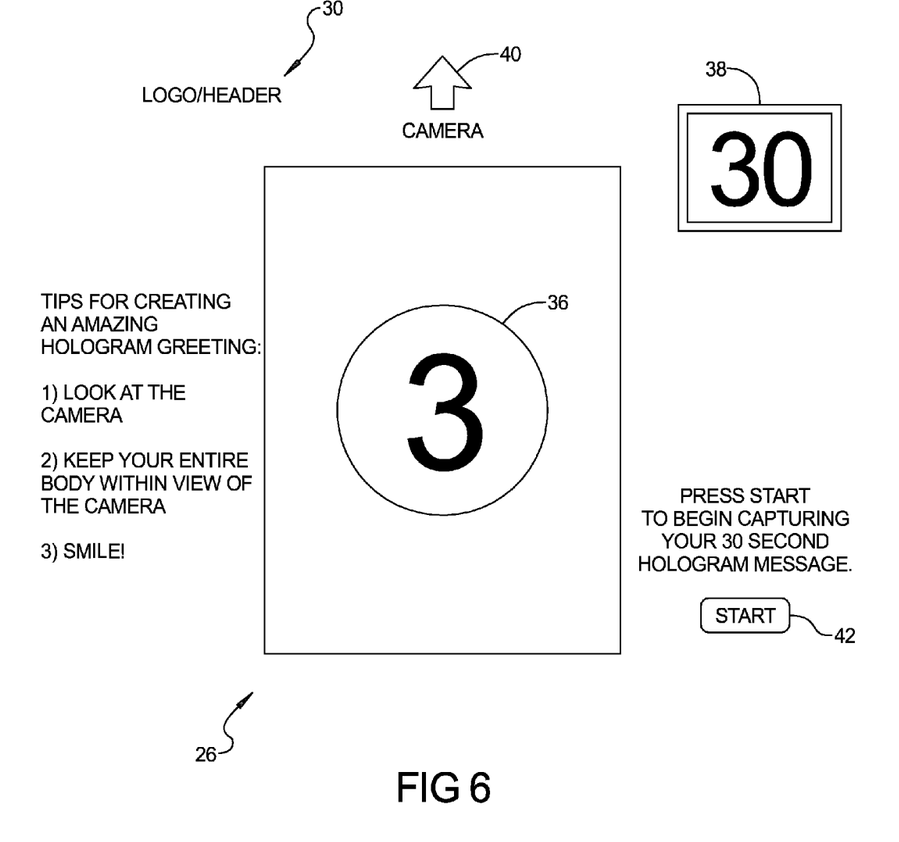
FIG. 6 is a representation of another displayed instruction that appears on the display screen of the kiosk of the present invention.

With reference now to FIGS. 4-6, there is depicted a method for recording a message in the practice of the present invention. Here, person 28 may be greeted by the display screen 26 showing the image depicted in FIG. 4. (The "LOGO/HEADER" indicator 30 shown in FIG. 4 is intended to represent a branding opportunity that may be sold by the operator of the service to an establishment or used by the operator of the service, but otherwise is considered optional.) A human/machine interface is provided, where the display screen 26 is a touchscreen, to allow the person 28 to input his or her responses. A demo button 32 may be clicked or touched to show the person 28 how to record and send a greeting. (The use of the term "Hologram" and derived terminology in the instructions are not to be taken literally.) After clicking, the person may be presented with an image appearing on display screen 26. When the person 28 presses or touches demo button 32, the display changes to that shown in FIG. 5. After person 28 presses or touches a "begin" button, such as at 34, the display changes to that shown in FIG. 6. This screen includes a countdown start timer 36, a recording time remaining counter 38, and an arrow 40 pointing to camera 20,. When person 28 presses the start button 42, countdown timer 36 starts counting down to zero, giving person 28 time to position himself or herself in a desired location in front of camera 20. While camera 20 is activated and recording person 28, countdown timer 38 counts down to zero to give person 28 an indication of the time remaining for the recording.

One or more microphones (not shown) may be provided to record a sound track, for example, a stereophonic or monophonic sound track. The video recording thus is able to include recorded voice or audio messages as well as a video track. The audio signal may include or be mixed with music, animal sounds, vehicular sounds, or other sounds The sounds that are mixed with the recorded audio may be added during recording or sometime thereafter, and may be prerecorded sounds. Where both the mixed sounds and props are present, the mixed sounds may be related to the environment simulated by props 24, if present, and/or a simulated background provided in place of the green screen by chroma keying.

Figure 7:
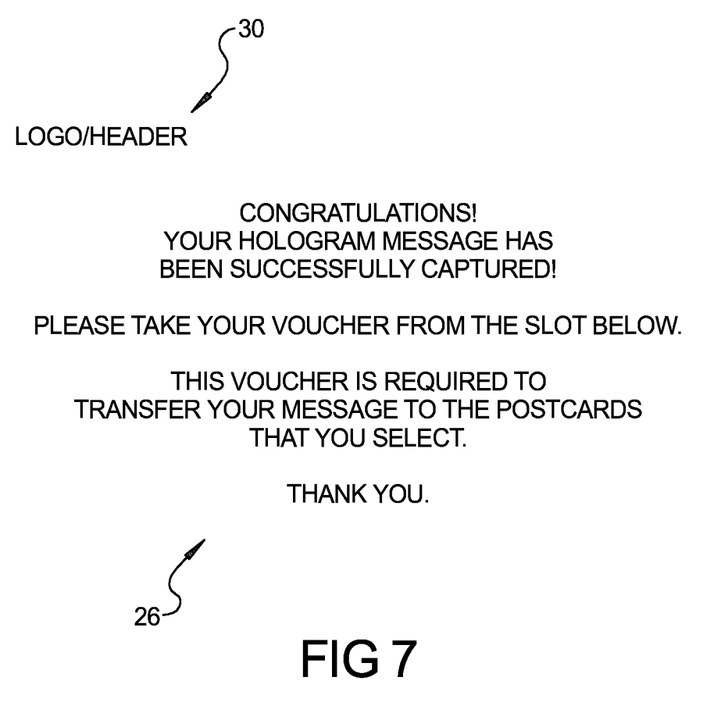
FIG. 7 is a representation of a concluding screen that appears on the display screen of the kiosk of the present invention after a message is recorded.

Referring now to FIG. 7, after the recording is made, the display screen 26 switches to instructing person 28 how to link the message to a unique code 52 or indicia 54 ssociated with a selected post card 44 or other type of card or object that may be provided, depending upon the embodiment of the invention.

It should be noted that the side of card 44 having code 52 or scannable indicia 54 may be chemically or otherwise processed to reduce or eliminate glare.

It should be noted that the person 28 in the field of view of camera 20 need not stand still for the duration of the recording, but is free to wander about, move, or gyrate in whatever fashion suits his or her mode within the field of view of camera 20. The magnification and/or focus of the camera 20 is also either adjustable or configured to automatically adjust itself as the person 28 moves.

It will be understood that it is not required that there be only one person 28 in the field of view of camera 20, and that the person or persons 28 or other object in the field of view need not necessarily be the person or persons paying for the recording of the message or operating or controlling camera 20.

Furthermore, the display screen 26 may be rendered viewable and drawn to the person being recorded and shows along with a virtual background that replaces the green screen background. Such a display screen 26 provides feedback to the person 28 being recorded so that he or she can better position and/or move him or herself amongst any props 24 or virtual background to achieve a desired effect. Also, an electronic partial video background (not shown) that replaces a portion of the green screen background to make it appear as though the person 28 is standing in front of a particular scene may be provided. The partial video background may be shown on the visual display screen 26 to allow, for example, the person 28 being recorded to orient him or herself in the scene and/or to point to objects in the scene.

Referring, again, to FIG. 3 and FIG. 8, a positioning guide 41 or other indication may be placed on the floor 16 of kiosk 10 to define a preferred region in which the person 28 records the message. The guide 41 ensures the participant's full body appear within the camera view. This is important to allow the person's image when viewed by the recipient, to appear to be standing on the card 44, such as the post card , when the message is played back on a screen such as the recipient's personal computer screen. (FIG. 8) A calibration marker 56 may also be provided and used to aid in this playback. The manner in which playback is accomplished is described more fully below. As noted above, the card 44 itself may be a picture postcard on one side, with the scannable indicia 54, or other code 52 and the calibration marker printed area 56 or symbol on the other side.

Although not shown in the drawing, kiosk 10 may, also, include a computer and associated memory as well as a printer and/or a scanner. The computer and associated memory can be used, among other things, to digitally record the message using the camera (and microphone, if provided), to operate the display screen. In practicing the present invention it is important to note that since no background is added to the video, i.e., a transparent/alpha channel, only a person standing in front of the screen is captured by the video. Other 3D objects or props may be added to this augmented reality environment separate from the video frame. It is possible, however, to capture only a person's head while the rest of the background remains transparent. The head could then be superimposed on another body masking the person's body with the same "green" material as the background screen.

Figure 8:
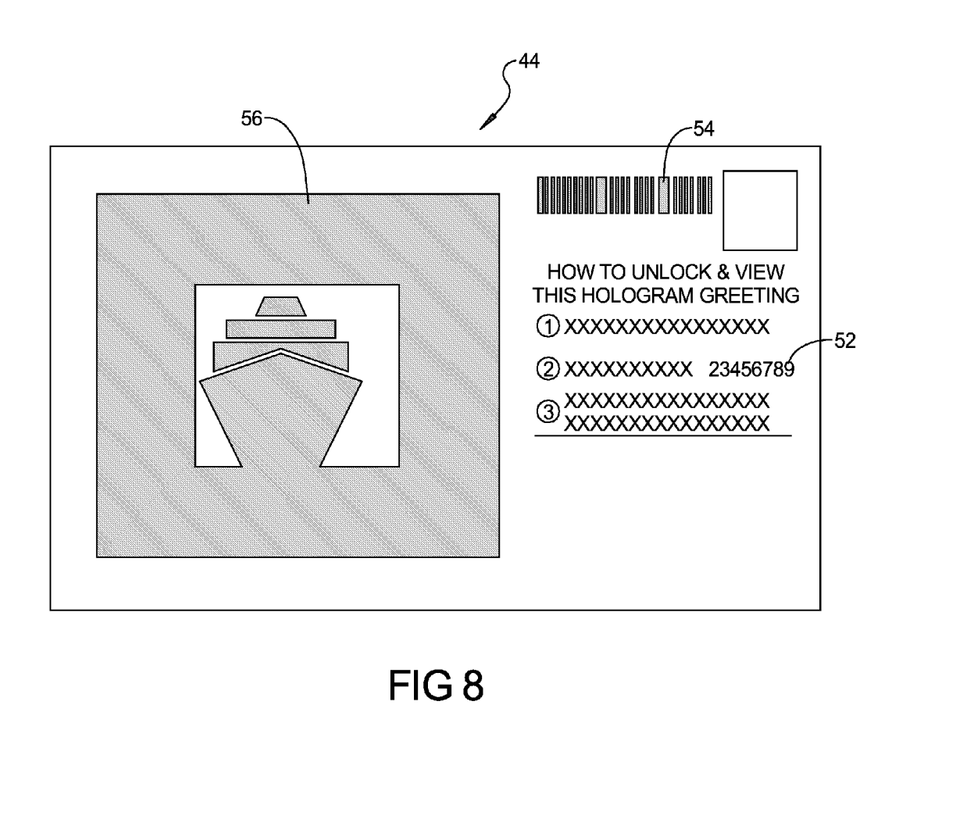
FIG. 8 is a representation of a post card useful in the practice of the present invention.
Figure 9:
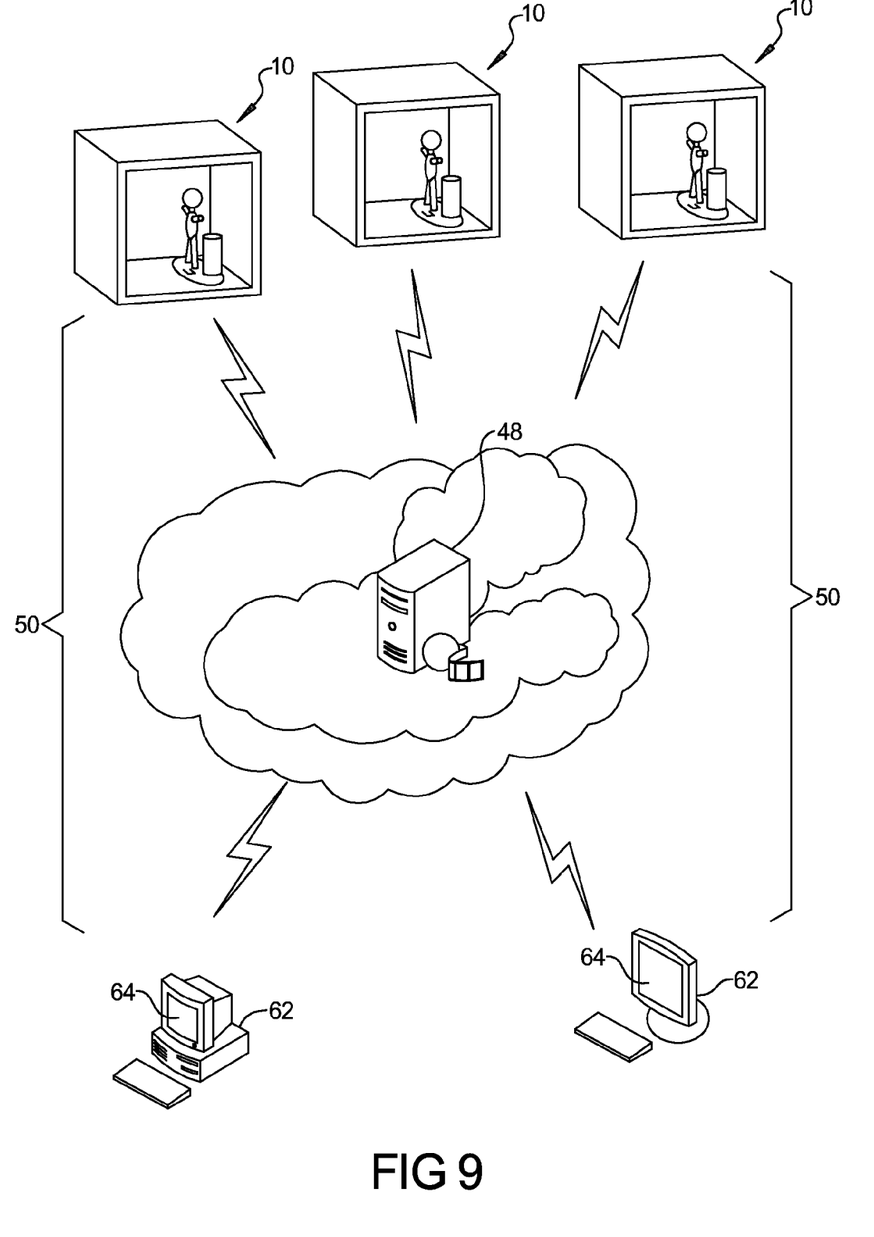
FIG. 9 is a pictorial block diagram of a networked system of the present invention.

Referring to FIG. 9, a message, once recorded, is sent from the kiosk 10, as a file, to a secure website 48 via a network, such as the Internet 50. This configuration permits a plurality of kiosks 10 to share a common secure website 48. The secure website 48 may be located at the kiosk 10 itself, or remotely therefrom. Similarly, other kiosks do not necessarily share the same website. Referring again to FIG. 8, a preprinted or postprinted code 52 or a scannable indicia 54 is provided. The scannable indicia may be a barcode or a QR code. To associate the recorded message to a file that is stored at the secure website 48. The printer located at the kiosk prints the unique code 52 or indicia 54 either directly onto the card 44 or on a sticker that can be affixed to the card 44 before or after the message is recorded. The preprinted code 52 or scannable indicia 54 is associated with the recorded file after being scanned by a scanner at the kiosk. Either method provides a unique way to associate a recorded file with a code 52 or indicia 54 that can be provided on a postcard 44 to be sent to the recipient.

According to the present invention, card 44, also, includes a special printed area or calibration marker or symbol 56 which is recognized by the server to display the signal in that region. As the card 44 is moved, the image captured within the region defined by the marker will maintain the proper perspective or size of the recorded image in relation to the calibration marker.

Figure 10:
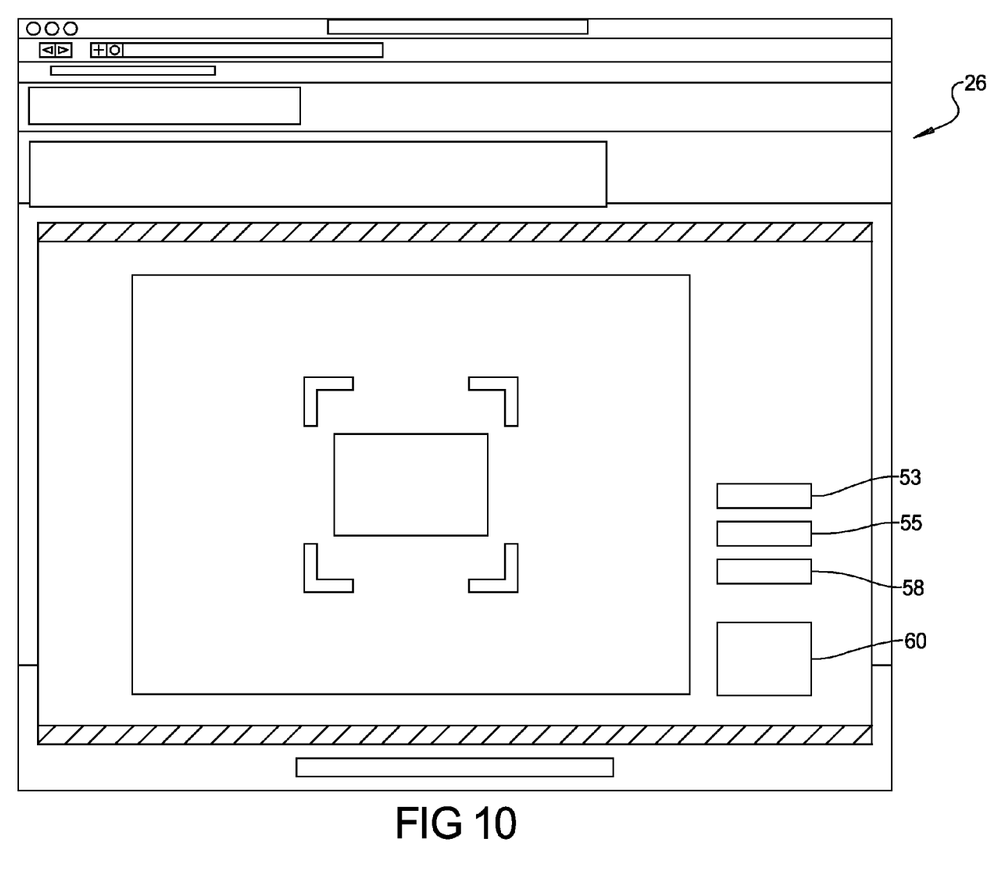
FIG. 10 is a representation of an initial page of a website used in the present invention.

It is to be understood rather than using a card 44, the sender can select an email button 53 to email the greeting, an embedding button 55 to embed the greeting in another electronic message, or a download button 58 to download the greeting to, for example, a CD-ROM, solid-state thumb drive, dropbox or the like. A message may also be placed on the website server 48 itself or shared via one or more social media sites by selecting a sharing button 60 with appropriate downloading instructions.

The recipient of the card 44 can use the code 52 or scannable indicia 54 to unlock the secure file and receive the audio-visual message by following instructions (e.g., instructions printed on card 44) to access the on-line website server 48 responsible for sending the audio-visual message to the recipient. (It is recognized that there are many techniques that are known and used for efficiently sending and receiving of files over a network such as the Internet, including, for example, the use of geographically distributed servers. The terminology "server" and "website" in the singular should therefore be read as also encompassing the use of more than one server and/or website in any particular embodiment, unless otherwise stated.) The instructions may include, for example, entering an address in a browser and/or using a program to scan or read the code and/or other indicia printed on the card. The website itself may include, for example, java code or active-X controls that can run on the recipient's computer to scan the code 52 and/or other indicia 54 to identify the secure file being requested.

Figure 11:
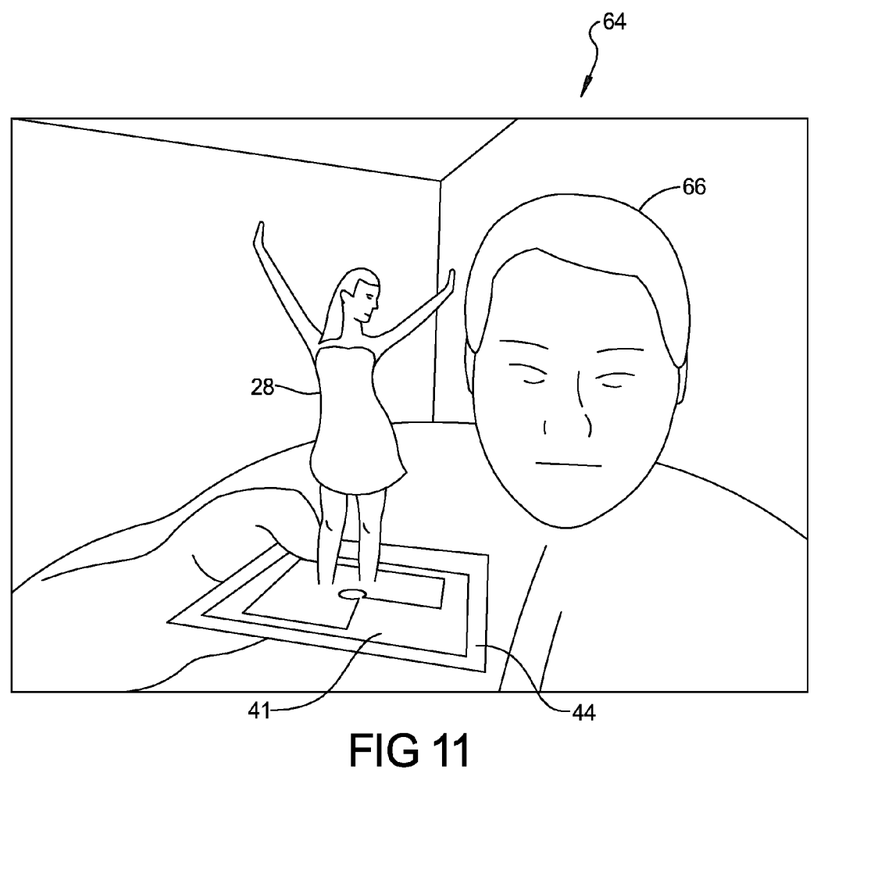
FIG. 11 is a representation of an enhanced message displayed in the present invention.

Referring to FIG. 9, to play the secure file associated with the code 52 or other indicia 54, the web site 48, a program on the recipients computer 62 having a display screen 64, requests that the recipient indicate his or her readiness to view the message by, for example, pressing a key or clicking a button. After this is done, a webcam (not shown) associated with the computer 62 is turned on. The message is activated by displaying the special printed area or calibration marker 56 or symbol to the webcam. The message then plays back on the display screen 64, of the computer using standard green screen technology to substitute the view of the local webcam for the area of the video portion of the message that would otherwise be filled by the green screen (FIG. 11). The video portion of the message of person 28 can be resized and located to make it appear as though an image of person 28 is "popping up" from card 44.

Also, the location of the calibration marker 56 or symbol is tracked and the size and/or location of the video portion of the message is updated to make it appear as though the recorded video message moves with the card.

Any audio message portion associated with the video message is played through speakers of the computer 62.

Figure 12:
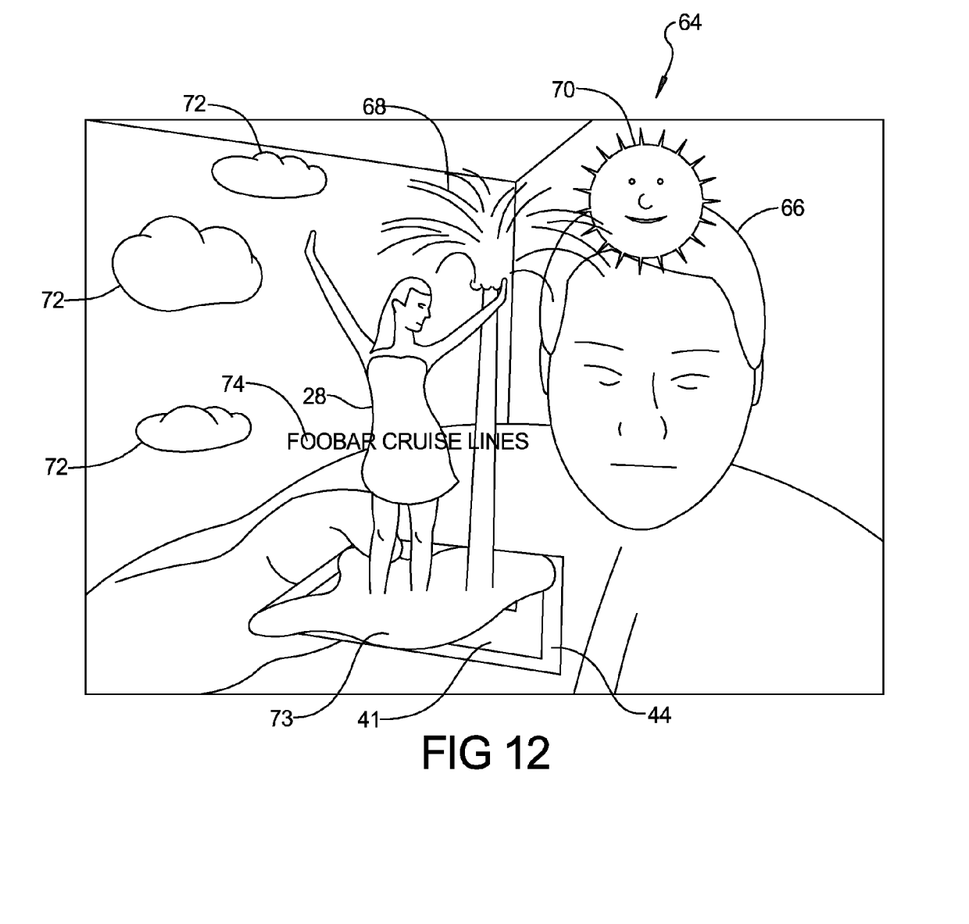
FIG. 12 is a representation of an alternately enhanced image displayed in the practice of the present invention.

Visual effects that can be achieved are illustrated in FIGS. 11 and 12. The recipient's computer 62 has a web cam that takes the picture of the recipient 66 is shown in FIGS. 11 and 12. The video streaming from the server 48 that corresponds to the coded message is shown with the green screen background replaced by a transparent background, and the person 28 who recorded the message appears on top of the post card 44 held in front of the web cam. Any props 24 that may have been included in kiosk 10 and that were within the field of view of the camera 20 in kiosk 10 will also appear, depending upon their color. The person 28 who recorded the message may be seen going behind or in front of props 24, depending upon that person's movements. If an enhanced reality background is provided, elements of that background (e.g., palm tree 68, sun 70, clouds 72, sand 73, the logo 74, and the like will also appear on display screen 64, at an apparent location behind or in front of the person 28 in the message and in front of the recipient 66 seen by the web cam.

It is also contemplated and within the purview hereof, to use a person's hand in lieu of a card and marker. The computer program will recognize a human hand and superimpose the 3D element over the hand. This renders the present invention amenable for use on social media sites such as Facebook, Twitter, etc. In such instances recipient will click on a link that includes the specific video identifier linking the recipient directly to the desired video. by hold their hand in view of the webcam, the augmented reality images will appear on the recipient's hand.

From a commercial standpoint, although a free service could be provided if desired, it is anticipated that, a fee will be collected from the person 28 in some manner, either electronically (e.g., using a credit or debit card reader or an electronic account code to control operation of the kiosk), manually (e.g., using a human operator to collect money or other credits and to control operation of the kiosk), mechanically (e.g., using a coin-operated or paper money collection switch), or otherwise. Thus, the structure may or may not be a self-service booth. Upon activation, the person wishing to appear in the message can record his or her message. Also, the booth-type structure could be eliminated and simply a free standing camera, compute, appropriate lighting and "green screen" background could be displayed.

For example, it is within the scope of the present invention for a parent to pay to have his or her children appear in a message, and for that parent to control content of the media by so instructing a camera operator.

It will thus be appreciated that method and apparatus embodiments disclosed herein provide enhanced messages that provide a substantial visual impact on recipients of such messages. While the invention has been described in terms of various specific embodiments, those skilled in the art will recognize that the invention can be practiced with modification within the spirit and scope of the claims.

What is claimed is:

1. An enhanced messaging system comprising:
a) a "green screen" background,
b) a camera configured to record a video of a person standing in front of the "green screen" background;
c) a medium configured to deliver a code or indicia corresponding to the recorded video to a recipient;
d) a "green screen" processor configured to alter at least a portion of the recorded video corresponding to the "green screen" background to render the at least a portion of the background transparent;
e) a recipient computer having a webcam and a display screen;
f) a web server responsive to the recipient computer and configured to display the altered video on a display screen of the computer when the code or indicia corresponding to the recorded video is received; and
wherein the recorded, altered video is viewed with the webcam that includes an image of a special marker, a location of the altered video on the display screen dependent upon a location of the image of the special marker on the display screen.

2. The system of claim 1 wherein the medium is a card.

3. The system of claim 1 wherein the medium is an electronic message.

4. A method for delivering an enhanced reality message, said method comprising:
a) sending a medium containing a code or indicia corresponding to a recorded video to a recipient, said video including an altered "green screen" background;
b) operating a web server to send the recorded video including the altered "green screen" background to a recipient computer when the corresponding code or indicia is received from the client computer; and
c) controlling the recipient computer to view the recorded, altered video over an image acquired by a webcam of the recipient computer, and to position the recorded video on a display screen of the recipient computer dependent upon a location of a special marker on an object seen by the webcam.

* * * * *